United States Patent
Harada et al.

(10) Patent No.: US 10,288,794 B2
(45) Date of Patent: May 14, 2019

(54) ILLUMINATION DEVICE OF VEHICLE

(71) Applicant: HAYASHI TELEMPU CORPORATION, Nagoya-shi, Aichi (JP)

(72) Inventors: Hiroshi Harada, Nagoya (JP); Hiroshi Sakuma, Nagoya (JP); Yousuke Usui, Nagoya (JP)

(73) Assignee: HAYASHI TELEMPU CORPORATION, Naka-ku, Nagoya-shi, Aichi (JP)

( * ) Notice: Subject to any disclaimer, the term of this patent is extended or adjusted under 35 U.S.C. 154(b) by 0 days.

(21) Appl. No.: 15/656,604

(22) Filed: Jul. 21, 2017

(65) Prior Publication Data

US 2018/0031756 A1 Feb. 1, 2018

(30) Foreign Application Priority Data

Jul. 27, 2016 (JP) ................. 2016-147094

(51) Int. Cl.
*B60Q 3/50* (2017.01)
*F21V 8/00* (2006.01)
*B60Q 3/217* (2017.01)

(52) U.S. Cl.
CPC .......... *G02B 6/0051* (2013.01); *B60Q 3/217* (2017.02); *B60Q 3/50* (2017.02); *G02B 6/0001* (2013.01); *G02B 6/0088* (2013.01)

(58) Field of Classification Search
CPC . B60Q 3/217; B60Q 3/50; B60Q 3/62; G02B 6/0001; G02B 6/0051; G02B 6/0088
See application file for complete search history.

(56) References Cited

U.S. PATENT DOCUMENTS

| | | | | |
|---|---|---|---|---|
| 8,356,921 B2 * | 1/2013 | Fujita | ............ | G02B 6/0008 362/488 |
| 9,121,565 B2 * | 9/2015 | Marcori | ............ | F21S 43/14 |
| 9,221,394 B2 | 12/2015 | Ukai et al. | | |
| 9,290,124 B2 * | 3/2016 | Pfeil | ............ | B60Q 3/78 |
| 9,352,686 B2 * | 5/2016 | Tahara | ............ | B60Q 3/51 |
| 9,469,243 B2 | 10/2016 | Omura et al. | | |
| 9,840,195 B2 * | 12/2017 | Inose | ............ | B60Q 3/51 |
| 2013/0242581 A1 | 9/2013 | Ukai et al. | | |
| 2015/0003093 A1 | 1/2015 | Omura et al. | | |
| 2016/0107566 A1 * | 4/2016 | Gasahl, IV | ............ | G02B 6/001 362/581 |

FOREIGN PATENT DOCUMENTS

| JP | 2015-009663 A | 1/2015 |
|---|---|---|
| JP | 5802103 B2 | 10/2015 |

* cited by examiner

*Primary Examiner* — Peggy A Neils
(74) *Attorney, Agent, or Firm* — Kagan Binder, PLLC

(57) ABSTRACT

An illumination device of a vehicle, including: a light source; a bar-shaped light guide member; and a diffusion member having a lens unit, the lens unit having an L-shaped cross-section, and a light-emitting portion and a light-receiving portion, wherein the light guide member has a light-emitting surface, and the light guide member and the lens unit are disposed such that a light-receiving surface of the light-receiving portion of the lens unit is opposed to the light-emitting surface of the light guide member.

9 Claims, 11 Drawing Sheets

FRONT ⟵⟶ REAR

INSIDE ⟵⟶ OUTSIDE

FRONT ←⎯⎯→ REAR

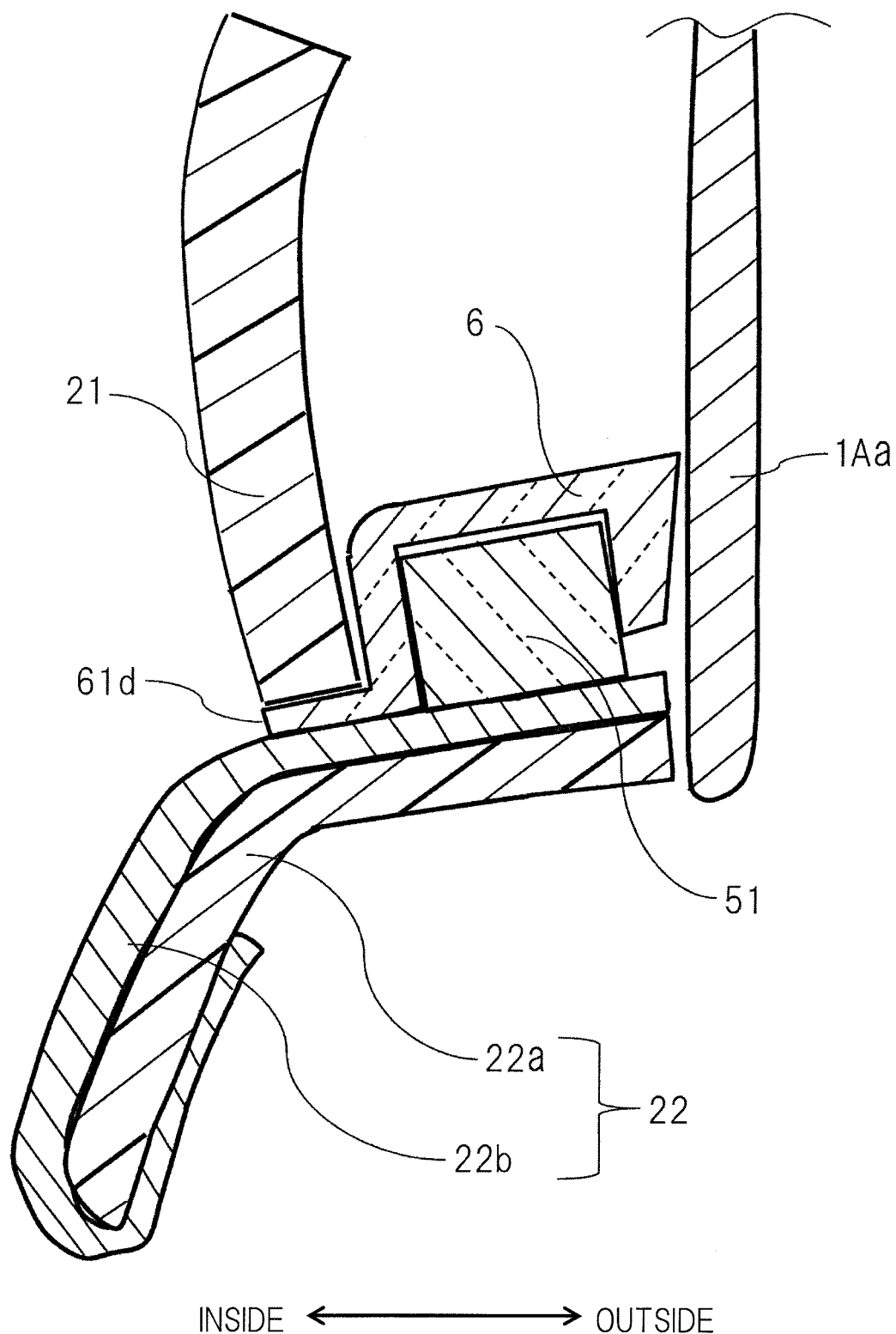

ILLUMINATION DEVICE OF VEHICLE

CROSS REFERENCE TO RELATED APPLICATIONS

This application is based on and claims Convention priority to Japanese Patent Application No. 2016-147094, filed Jul. 27, 2016, the entire disclosure of which is herein incorporated by reference as a part of this application.

BACKGROUND OF THE INVENTION

Field of the Invention

The present invention relates to an illumination device of a vehicle, and particularly relates to an illumination device utilizing direct light.

Description of Related Art

Interiors (in some case, exteriors) of vehicles such as automobiles are equipped with illumination structures that provide various use for drivers and/or passengers. In some illumination devices, the light emitted from a light source is utilized as direct light that is directly incident on eyes of a viewer (driver and/or passenger). In the other type of illumination devices, the light emitted from a light source is utilized as indirect light that is reflected by at least one section (illuminated section) of an interior and subsequently incident on the eyes of a viewer. The indirect light has an effect of presenting gentle light while the direct light has an effect of presenting light having high visibility. The indirect light and the direct light are selectively used depending on an object to be irradiated and/or the purpose of illumination.

In some types of illumination devices, light from a light source may be radiated via a light guide. For example, with respect to an illumination device mounted to a door trim of a vehicle and illuminates a handle housing unit that houses an inside handle, Japanese Patent Publication No. 5802103 describes a configuration in which a light guide made of a flexible material is disposed as a light emitter to an outer side (back side) of a decoration panel. Japanese Laid-Open Patent Publication No. 2015-9663 describes a configuration in which a light guide member is positioned between a decoration member and a cover member, and a vehicle cabin is illuminated with light from a linear light-permeable portion formed on a light-permeable decoration member.

Light guide members having a substantially cylindrical shape with a circular cross-section have been used in conventional illumination devices. In the device of Japanese Patent Publication No. 5802103, a light guide member having a substantially circular cross-section is held by a light guide holding member having a reflection surface. With regard to a configuration having a light guide member positioned between a decoration member and a cover member, Japanese Laid-Open Patent Publication No. 2015-9663 describes a configuration having a reflector provided at a surface of the cover member, by which the light which has been reflected toward the outside of the vehicle cabin is reflected to the direction of the interior of the vehicle cabin.

Conventional illumination devices having a light guide member made of a flexible material are each provided with a housing to hold the light guide member. For example, the light guide member is held on a decoration panel using a housing (light guide member holding member) in the device of Japanese Patent Publication No. 5802103. Japanese Laid-Open Patent Publication No. 2015-9663 also describe a configuration in which the light guide member is held by a housing (cover member). However, in a case where light emitted from a flexible light guide member is used as direct light, assembly of a housing disadvantageously increases component cost and man-hours. In addition, an illumination device including a housing has a large size, and therefore is subjected to significant restriction on mounting space.

In a conventional light guide member having a substantially cylindrical shape with a circular cross-section, which is used in an illumination device of a vehicle cabin, light is emitted from the entire circumference of the light guide member. Therefore, in order to enhance illumination efficiency, the light emitted towards the outside must be returned towards the cabin by a reflection layer provided on the housing. In Japanese Patent Publication No. 5802103, a reflection surface is provided on the housing (light guide member holding member) to enhance light utilization efficiency. Also in Japanese Laid-Open Patent Publication No. 2015-9663, a reflection layer is provided on the housing (cover member) to enhance light utilization efficiency. According to the conventional illumination devices using a cylindrical light guide member, it has been difficult to avoid the use of housing due to the requirement to form the reflection layer.

In the conventional illumination devices, in order to prevent illumination of an area other than a target area, a light-permeable member provided with a light-shielding layer is used as a member disposed to the inner side of the vehicle. For example, in the device of Japanese Patent Publication No. 5802103, a light-shielding layer is formed on the lower side of a panel formed of a light-permeable member. Japanese Laid-Open Patent Publication No. 2015-9663 describes a configuration in which a light-shielding layer is formed on the surface of a decoration member made of a light-permeable material, and the interior of the vehicle cabin is illuminated with light from the linear light-permeable section having no light-shielding layer. Thus, in the configuration having a light-permeable member provided with the light-shielding layer, selective options of material used as the decoration member and/or the degree of freedom in design are restricted. Further, the cost for formation of the light-shielding layer increases the total cost.

An object of the present invention is to provide a direct-light illumination device including a light guide member, which is compact in configuration, has a high degree of freedom in mounting design, and has excellent designability.

SUMMARY OF THE INVENTION

An illumination device of a vehicle according to the present invention includes: a light source; a bar-shaped light guide member; and a diffusion member including a lens unit, the lens unit having an L-shaped cross-section, and a light-emitting portion and a light-receiving portion, wherein the light guide member has a light-emitting surface, and the light guide member and the lens unit are disposed such that a light-receiving surface of the light-receiving portion of the lens unit is opposed to the light-emitting surface of the light guide member.

According to the illumination device having the above-described configuration, the light guide member can be disposed to a limited space with the diffusion member without using a large-sized housing. Further, the light guide member has a predetermined light-emitting surface, and light emitted from the light-emitting surface enters the diffusion member, and is subsequently emitted from the light-emitting portion of the lens unit of the diffusion member. Therefore, it is not necessary to form a light-shielding layer for preventing undesired light leakage.

In the above-described illumination device of a vehicle, the diffusion member may include a diffusion material (light scattering material) that diffuses light. Thus, light can be efficiently scattered in the diffusion member, thereby realizing more uniform light emission.

In the above-described illumination device of a vehicle, the diffusion member may have an engagement portion configured to hold the light guide member. In addition, the light guide member may have a step portion configured to be engaged with the engagement portion. By providing the engagement portion to the diffusion member, the light guide member can be fixed more stably. By configuring the light guide member to have the step portion to be engaged with the engagement portion, positioning of the light guide member is facilitated.

In the above-described illumination device of a vehicle, the light-emitting portion of the lens unit of the diffusion member may have a length of not less than 5 mm. By this configuration, the light is sufficiently diffused between a light-receiving surface and a light-emitting surface of the diffusion member, whereby light emission at the light-emitting surface can be made more uniform.

In the above-described illumination device of a vehicle, the light-emitting surface of the light guide member is preferably in close contact with the light-receiving surface of the lens unit with no gap therebetween. By this configuration, light-receiving efficiency can be further enhanced.

In the above-described illumination device, the light-emitting surface of the lens unit may be disposed between a first decoration member and a second decoration member which are components of a decoration panel of a door trim of a vehicle. By this configuration, illumination by direct light can be provided even from a space which is not suitable for disposition of conventional illumination device.

According to the present invention, the configuration of a direct light type illumination device having a light guide member can be made compact. Therefore, the illumination device for direct illumination can be disposed to a space even where it has been difficult to dispose a conventional illumination device due to dimensional restriction of the space. Thus, it is possible to increase the degree of freedom in space selection for disposition of the illumination device. For example, the illumination device may be disposed to a space directly above or directly below a decoration member of a door trim, or an area directly above or below a metal molding. Further, since the number of components required for mounting the illumination device can be reduced and thereby process steps required for assembly of these components can be omitted, costs such as material cost and labor cost can be reduced. Moreover, in the illumination device according to the present invention, it is possible to realize uniform light-emission through the diffusion member, and it is easy to keep balance in color tone with adjacent design members when the illumination device does not emit light, resulting in excellent designability.

BRIEF DESCRIPTION OF THE DRAWING

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 10 illustrates the structure of the door trim, near a decoration panel, at a cross-section thereof taken along X-X line in FIG. 9.

DETAILED DESCRIPTION OF THE INVENTION

Hereinafter, embodiments of the present invention will be described with reference to the drawings.

Figure 1:
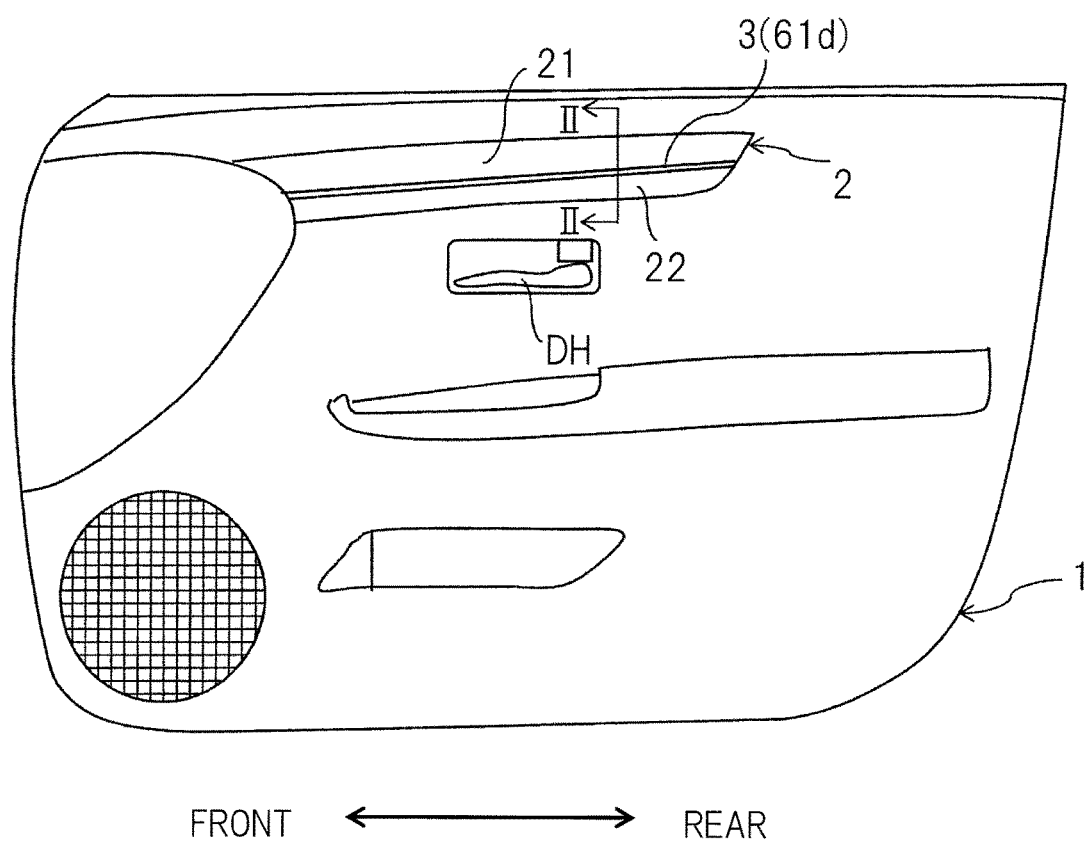
FIG. 1 is a schematic front view of a door trim of a front door on which an illumination device according to an embodiment of the present invention is mounted, as seen from inside a vehicle cabin.

FIG. 1 is a schematic front view of a door trim of a front door seen from an interior of the vehicle cabin, where the door trim is equipped with an illumination device according to an embodiment of the present invention. A decoration panel 2 is provided to an upper portion of the door trim 1, above a door handle DH. The decoration panel 2 has a first decoration member 21 in upper side and a second decoration member 22 including a metal molding in lower side. The illumination device 3 according to the present embodiment is disposed between the first decoration member 21 and the second decoration member 22. By this arrangement, a light-emitting surface 61d (described later) of the illumination device 3 is observed from inside the vehicle cabin, and the illumination device 3 serves as an illumination device of direct illumination type provided at the position of the decoration panel 2.

Figure 2:
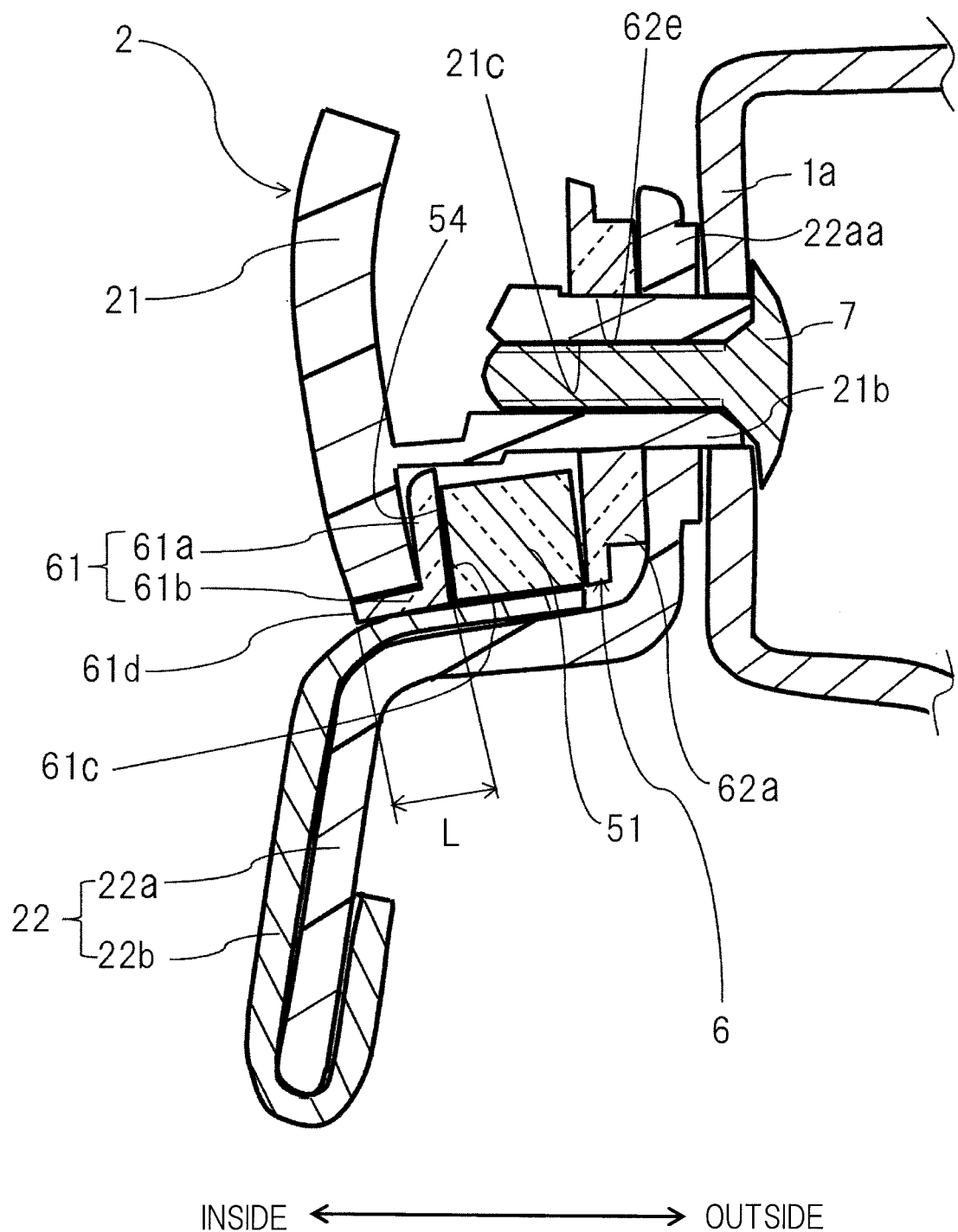
FIG. 2 illustrates the structure of the door trim, near a decoration panel, at a cross-section thereof taken along II-II line in FIG. 1.

FIG. 2 is a schematic diagram illustrating a part (a part near the decoration panel 2) of the door trim at a cross-section taken along II-II line in FIG. 1. The illumination device 3 includes: a light guide member 51 that guides light from a light source (not shown); and a diffusion member 6 that holds the light guide member 51. The light emitted from the light guide member 51 is diffused in the diffusion member 6 and is emitted to the interior space of the vehicle cabin. The diffusion member 6 includes a lens unit 61 having an L-shaped cross-section. The lens unit 61 has: a light-receiving portion 61a opposed to a light-emitting surface 54 of the light guide member 51; and a light-emitting portion 61b that emits the light emitted from the light guide member 51 to the outside of the illumination device 3. The light-emitting portion 61b of the lens unit 61 is inserted directly below the first decoration member 21, and an end surface (light-emitting surface 61d) thereof is exposed to the inside of the cabin. A second decoration member 22 comprising a resin base 22a and a metal molding 22b is disposed below the illumination device 3. In the present embodiment, a tubular fastening portion 21b of the first decoration member 21 is inserted so as to penetrate the diffusion member 6 holding the light guide member 51, an extended vertical wall portion 22aa of the resin base 22a of the second decoration member 22, and a base body 1a of the door trim. By screwing a fastening member (e.g., a screw body) 7 into a screw hole 21c of the fastening portion 21b from the door trim base body 1a side, the first decoration member 21, the second decoration member 22, and the diffusion member 6 are fastened and fixed to the base body 1a of the door trim.

In the present embodiment, the light-emitting surface 61d of the lens unit 61 of the diffusion member 6 is preferably arranged substantially flush with the surface of the first decoration member 21. Thus, colorations of the first decoration member 21 and the diffusion member 6 are assimilated when light is turned off, thereby preventing the lens unit 61 from being conspicuous.

<Diffusion Member>

Figure 3:
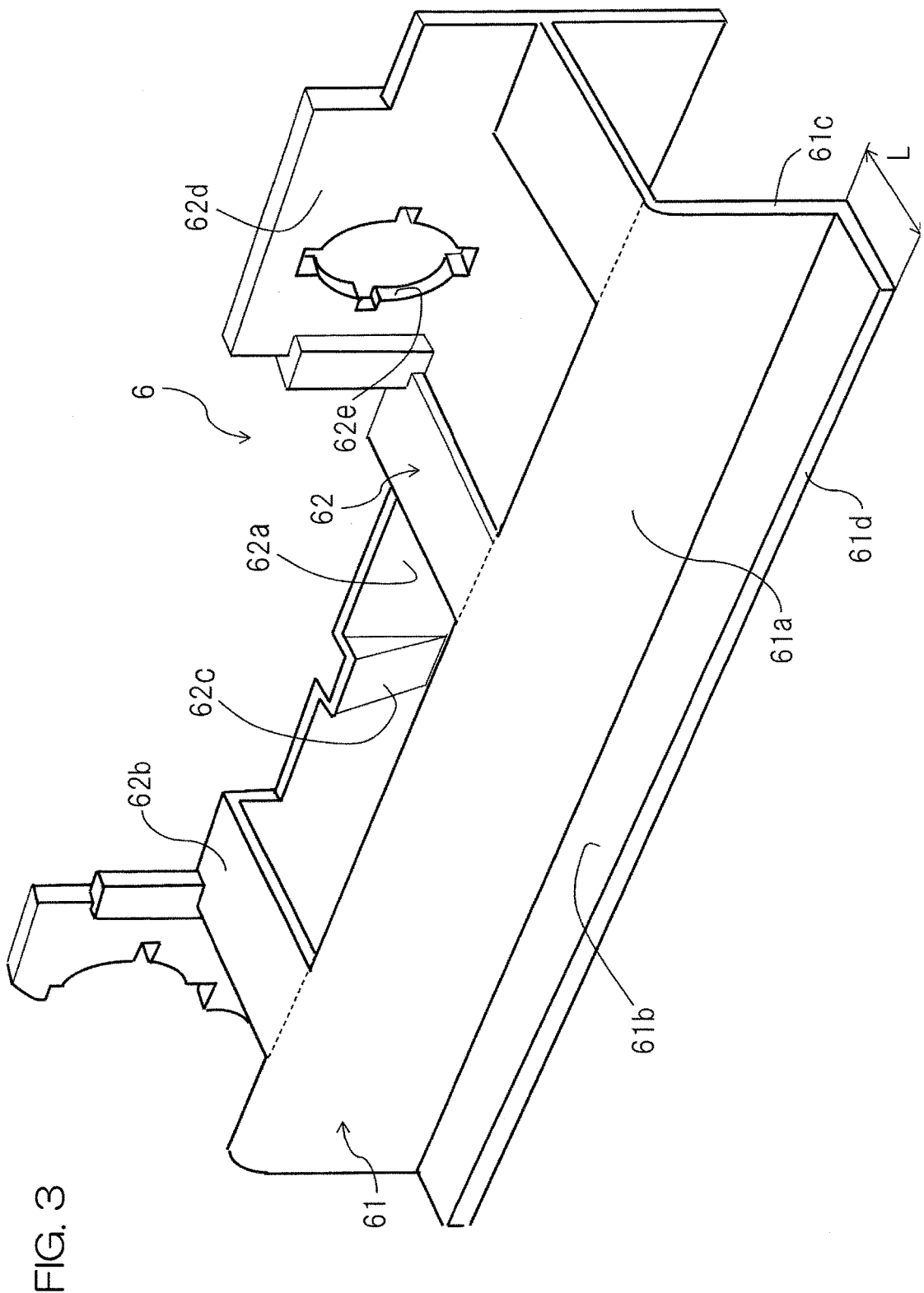
FIG. 3 is a perspective view illustrating a diffusion member of an illumination device according to an embodiment of the present invention.

FIG. 3 is a perspective view illustrating an embodiment of a diffusion member 6 used in the present invention. The diffusion member 6 includes: a lens unit 61 having an L-shaped cross-section; and an accommodation unit 62 that supports the lens unit 61 and accommodates the light guide member 51. The lens unit 61 and the accommodation unit 62 may be integrally formed, or may be individually formed as separate members and then connected together. The size of the lens unit 61 is set in accordance with the size of the light guide member 51 (FIG. 2), and is not particularly limited. The width of the light-emitting portion 61b (a distance L from the light-receiving surface 61c to the light-emitting surface 61d) is preferably not less than 5 mm.

In the illustrated embodiment, the accommodation unit 62 has: a back wall portion 62a opposed to a reflection surface 55 of the light guide member 51; and a bridge portion 62b. The bridge portion 62b connects the back wall portion 62a and the lens unit 61. In the present embodiment, the back wall portion 62a has a wedge-shaped engagement portion 62c. The back wall portion 62a partially extends upward to form engagement pieces 62d, and a hole 62e is formed in each of the engagement pieces 62d. Through the hole 62e, the illumination device can be fixed to the base body 1a of the door trim 1. For example, a fixing member such as the fastening portion 21b of the first decoration member 21 shown in FIG. 2 may be inserted through the hole 62e. Alternatively, the hole 62e may be formed as a screw hole, and the illumination device may be fixed to the base body 1a by using a screw. The length of the diffusion member 6, the numbers and arrangement intervals of the bridge portion 62b, the engagement piece 62d, the hole 62e, and the engagement portion 62c, and the like can be appropriately adjusted in accordance with the position where the illumination device is disposed, the size of the light guide member, and the like. In the diffusion member 6 shown in FIG. 3, the lens unit 61 having the L-shaped cross-section is connected to the back wall portion 62a by the bridge portion 62b, but the shape of the accommodation unit 62 of the diffusion member 6 is not limited thereto. For example, the lens unit 61 and the back wall portion 62a may be connected to each other by a single continuous top plate. The illumination device 3 may be fixed to the first decoration member 21 by providing the diffusion member with a hook portion (not shown) and hooking the hook portion on a claw portion (not shown) of the first decoration member 21.

The material of the diffusion member 6 is not particularly limited, and any material may be used as long as the material is capable of transmitting and diffusing light. For example, polycarbonate is suitably used, which allows injection molding of the diffusion member 6. A material that diffuses (scatters) light is preferably dispersed in the diffusion member 6, particularly, the lens unit 61. By dispersing such a light-diffusing material, light received by the light-receiving portion can also be efficiently diffused, and at least a part of the light can be emitted through the light-emitting portion. By adjusting the mixed amount of the light-diffusing material, the amount of the emitted light can be adjusted. As an example of the light-diffusing material, silicone resin particles may be used.

Figure 4:
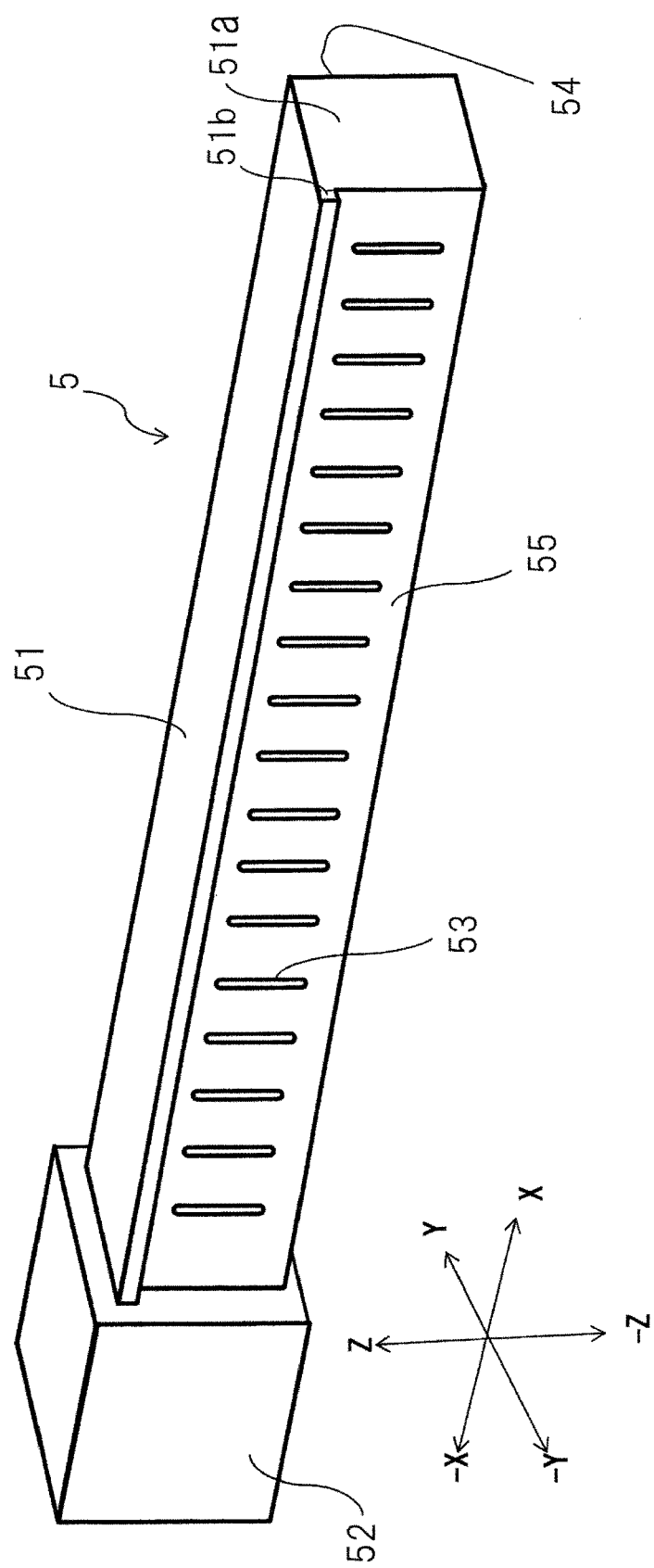
FIG. 4 is a perspective view illustrating a light emitter (a light guide member connected with a light source) of the illumination device according to the embodiment of the present invention.

In the embodiment of the present invention, the lens unit 61 containing the light-diffusing material may present opaque white, or may be colored within a range that does not disturb visual recognition when light is emitted. For example, if the lens unit 61 is colored, the lens unit 61 is balanced in color tone with neighboring designs when light is turned off, whereby designability of the interior of the door trim is enhanced. <Light emitter> FIG. 4 is a perspective view schematically illustrating an embodiment of a light emitter 5 used in the illumination device of the present invention. The light emitter 5 of the present embodiment includes a light guide member 51 and a light source 52, and the light source 52 is connected to one end of the elongated or long bar-shaped light guide member 51. The light source 5 includes a light source body, a case, and a wiring harness which are not shown. The light source 5 is assembled to the diffusion member 6 or the door trim base body 1a by an engagement portion formed in the case. The harness is connected, via a connector, to a power source of electronic component (not shown) provided inside the vehicle cabin.

The type of the light source body is not particularly limited. For example, an incandescent lamp, a halogen lamp, or the like can be used. In the present embodiment, a light-emitting diode (LED) is used. The shape (e.g., shell type, SMD type, etc.) and color of the LED are not particularly limited. For example, an LED manufactured by NICHIA CORPORATION may be used.

While in the present embodiment, the light source 52 is provided only at one end of the light guide member 51, the light source 52 may be provided at each of both ends of the light guide member 51 to prevent uneven light emission. Further, design effect may be enhanced by using a plurality of light source bodies emitting light of different colors in combination.

<Light Guide Member>

In the light emitter 5 shown in FIG. 4, the long bar-shaped light guide member 51 is used. The cross-sectional shape of the light guide member 51 is not particularly limited as long as a light-emitting surface for emitting light is formed, and may be a polygonal shape such as a rectangular shape. However, at least a part of the surface of the light guide member may be curved, and the contour of the cross-section of the light guide member 51 may include a curved portion. The longitudinal axis of the light guide member may be linear, or at least a part thereof may be curved. The material of the light guide member is not particularly limited, and may be an acrylic resin such as PMMA, for example.

Preferably, a light guide member 51, except a step portion 51b, having a substantially rectangular cross-section may be used. The light guide member 51 according to the embodiment shown in FIG. 4 has a cross-sectional shape in which the step portion 51b to be engaged with the engagement portion is added to one side of a substantially rectangular body 51a.

Optical patterns may be preferably formed at a longitudinal surface of the light guide member. In the present embodiment, one surface of the light guide member 51 is the light-emitting surface 54, and optical patterns 53 are formed on one surface (reflection surface) 55 opposite to the light-emitting surface 54.

Figure 5:
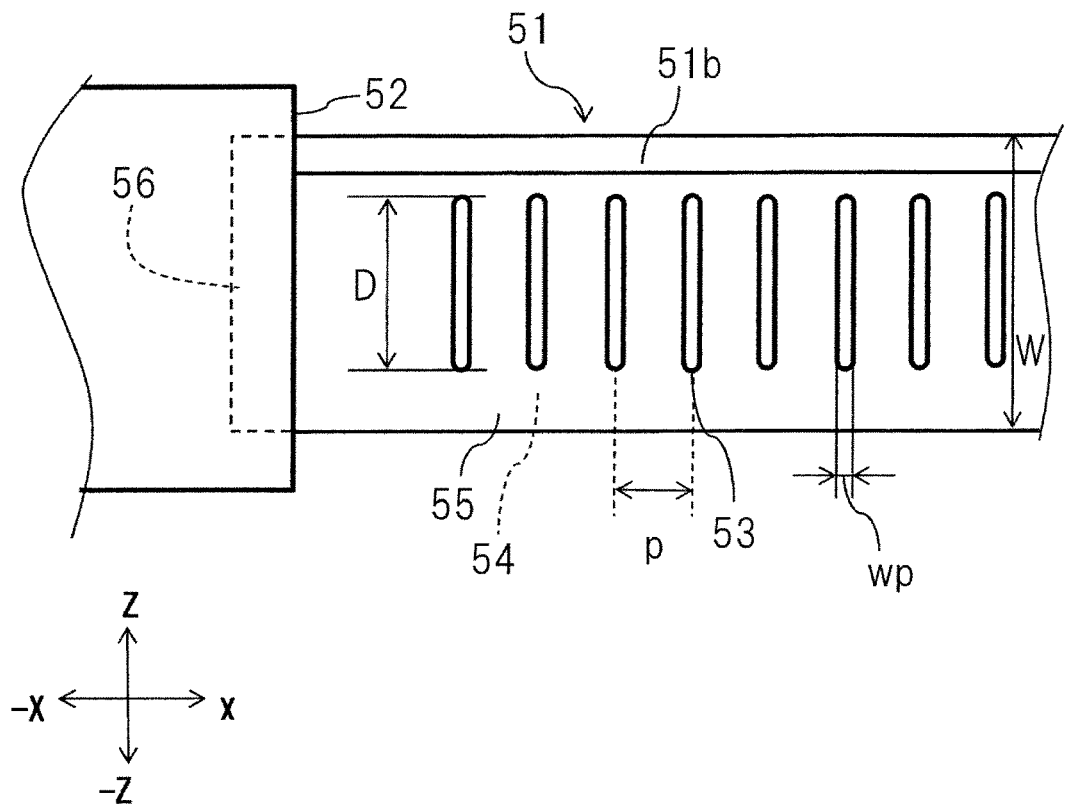
FIG. 5 is a front view of a part of the light emitter shown in FIG. 4, as seen from a side where a reflection surface is present.

FIG. 5 is a partially enlarged view of the light guide member 51. Light emitted from the light source 52 enters a light incident surface 56 formed at one end of the light guide member 51, travels toward the other end of the light guide member 51 along the longitudinal direction, and is reflected by the optical patterns formed on the reflection surface 55 toward the light-emitting surface 54 (rear side of FIG. 5) opposing the reflection surface 55. The reflected light passes through the light-emitting surface 54, enters the light-receiving surface 61c of the diffusion member 6 shown in FIG. 3, and is emitted from the light-emitting surface 61d. Regarding the shape, dimension, and the like of the optical patterns 53 shown in FIG. 5, optimum conditions are preferably selected in accordance with the size and shape of the light guide member 51, the material and shape of the diffusion member 6, the positional relationship between the light guide member 51 and the diffusion member 6, and the like.

The optical patterns 53 shown in FIG. 5 are provided at a center portion, in the width direction (z axis direction), of the reflection surface 55 in the present embodiment, but may be provided at a position shifted from the center portion. The optical patterns 53 of the present embodiment are groove-shaped optical patterns having the same length (e.g., D=1.9 mm) and arranged at equal intervals at a regular pitch (e.g., p=1.0 mm). However, depending on conditions, the pitch p of the adjacent optical patterns 53 may be varied, or the dimension (at least one of length D, depth d, width wp, etc.) of each optical pattern 53 may be varied. For example, the depth d of each optical pattern 53 may be varied within a range of about 0.1 to 0.5 mm.

Figure 6:
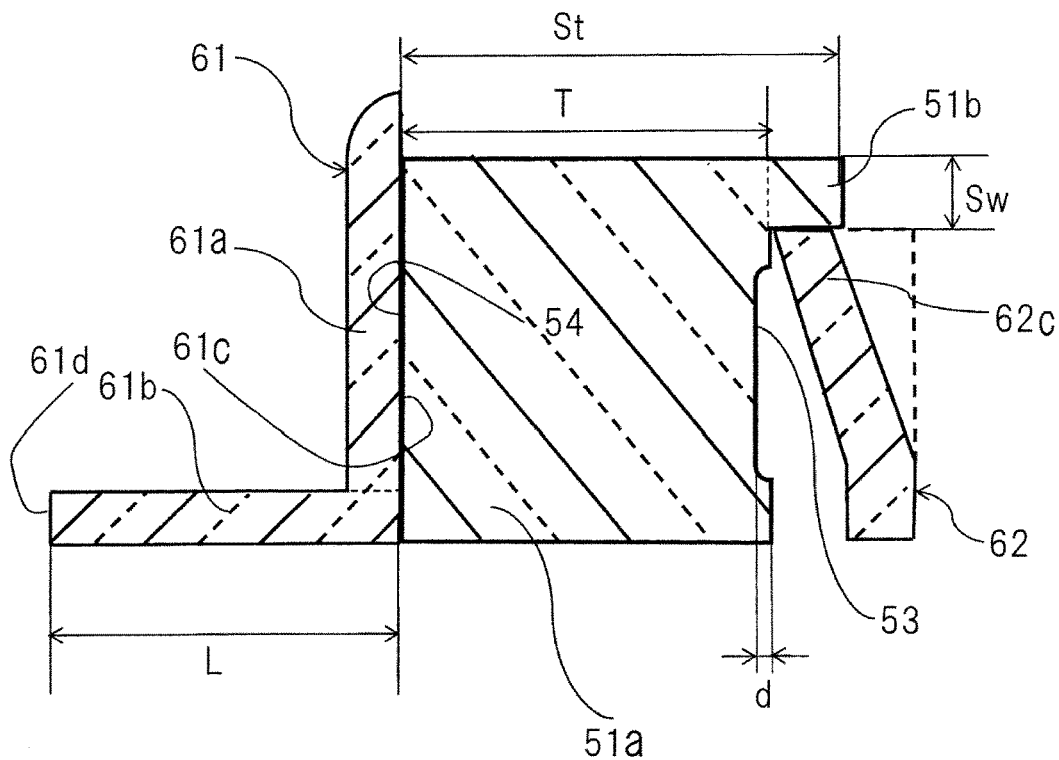
FIG. 6 is a cross-sectional view of the light guide member shown in FIG. 4 which is mounted to the diffusion member shown in FIG. 3.

FIG. 6 is a schematic cross-sectional view, at the position of the engagement portion, illustrating a state where the light guide member 51 shown in FIGS. 4 and 5 is mounted to the diffusion member shown in FIG. 3.

The cross-sectional shape of each optical pattern 53 is not particularly limited, and examples thereof include semi-circle, triangle, ellipse, and rectangle. In the present embodiment, each optical pattern 53 has a groove shape having a semi-circular cross-section, and a ratio d/T of the groove depth d to the thickness T of the light guide member body 51a (the dimension in the direction perpendicular to the light-emitting surface 54) is preferably 0.02 to 0.25. For example, d may be equal to 0.1 mm.

While in FIGS. 4 and 5, the groove-shaped optical patterns substantially perpendicular to the extending direction of the light guide member are shown, the shape of the optical patterns is not limited thereto. The optical patterns may be recesses each having a predetermined shape such as hemisphere, cone, truncated cone, pyramid, or truncated pyramid, arranged at predetermined intervals along the extending direction of the light guide member. In this case, recesses having a constant depth may be arranged at constant intervals. However, the depths and/or arrangement intervals of the recesses may be varied. For example, the recesses may become deeper with increasing distance from the light source.

In the present embodiment, the step portion 51b is provided at one side end portion of the reflection surface 55 of the light guide member 51. At that end portion having the step portion 51b, the thickness St of the light guide member (the distance from the light-emitting surface to the surface of the step portion) is greater than the thickness T of the other portion (the distance from the light-emitting surface 54 to the reflection surface 55). The thickness St of the light guide member with the step portion and the width of the step portion Sw in the z axis direction are determined in accordance with the shape and/or size of the engagement portion 62c (FIG. 3) to be engaged with the step portion. For example, the ratio St/T of the thickness St of the light guide member with the step portion to the thickness T of the other portion of the light guide member may exceed 1, and preferably may be 1.05 to 1.3. The ratio Sw/W of the width Sw of the step portion to the width W of the light guide member may be not greater than 0.3, and preferably 0.05 to 0.20.

In the embodiment shown in FIGS. 4 and 5, the step portion is provided substantially over the entire longitudinal direction of the light guide member. However, as a step portion, for example, a rectangular parallelepiped projection may be provided in the light guide member 51 at a position corresponding to the engagement portion of the diffusion member shown in FIG. 3.

The light guide member 51 may have a tapered shape in which the area of the cross-section (Y-Z cross-section) thereof decreases the further away from the light source 52. Thus, the number of times of light reflection in the light guide member 51 increases, whereby the amount of the emitted light can be increased without changing the shape and/or number of the optical patterns 53 formed on the light guide member 51, and the tip of the light guide member 51 is prevented from being darkened. Therefore, one light source unit only needs to be provided at one side of the light guide member, whereby the number of components and assembling man-hours are reduced, which is advantageous in costs and increases the degree of freedom regarding the arrangement space.

Regarding the formation method of the optical patterns 53, in the present embodiment, the optical patterns 53 are formed by forming projected portions at positions corresponding to the optical patterns 53 in an injection molding die used for molding the light guide member 51. Thus, the optical patterns 53 are formed simultaneously with the injection molding. However, the optical patterns 53 may be formed by cutting, laser processing, or the like after the injection molding.

As shown in FIG. 6, the light guide member 51 is held at a predetermined position by the light-receiving surface 61c of the lens unit 61 and the engagement portion 62c of the accommodation unit 62. The light-receiving surface 61c of the lens unit 61 and the light-emitting surface 54 of the light guide member 51 are preferably in close contact with each other, with substantially no gap therebetween. If there is a gap between the light-receiving surface 61c and the light-emitting surface 54, light-receiving efficiency is degraded, and the light guide member 51 cannot be stably held. Light that comes from the light guide member 51 and enters the light-receiving portion 61a of the diffusion member 6 is diffused in the light-receiving portion 61a and emitted from the light-emitting surface 61d together with light that enters the light-emitting portion 61b from a lower portion of the light guide member 51. The width L of the light-emitting portion 61b (the distance from the light-receiving surface 61c to the light-emitting surface 61d) is preferably not less than 5 mm. If the width L is small, emission of local light pattern is likely to occur.

Figure 7:
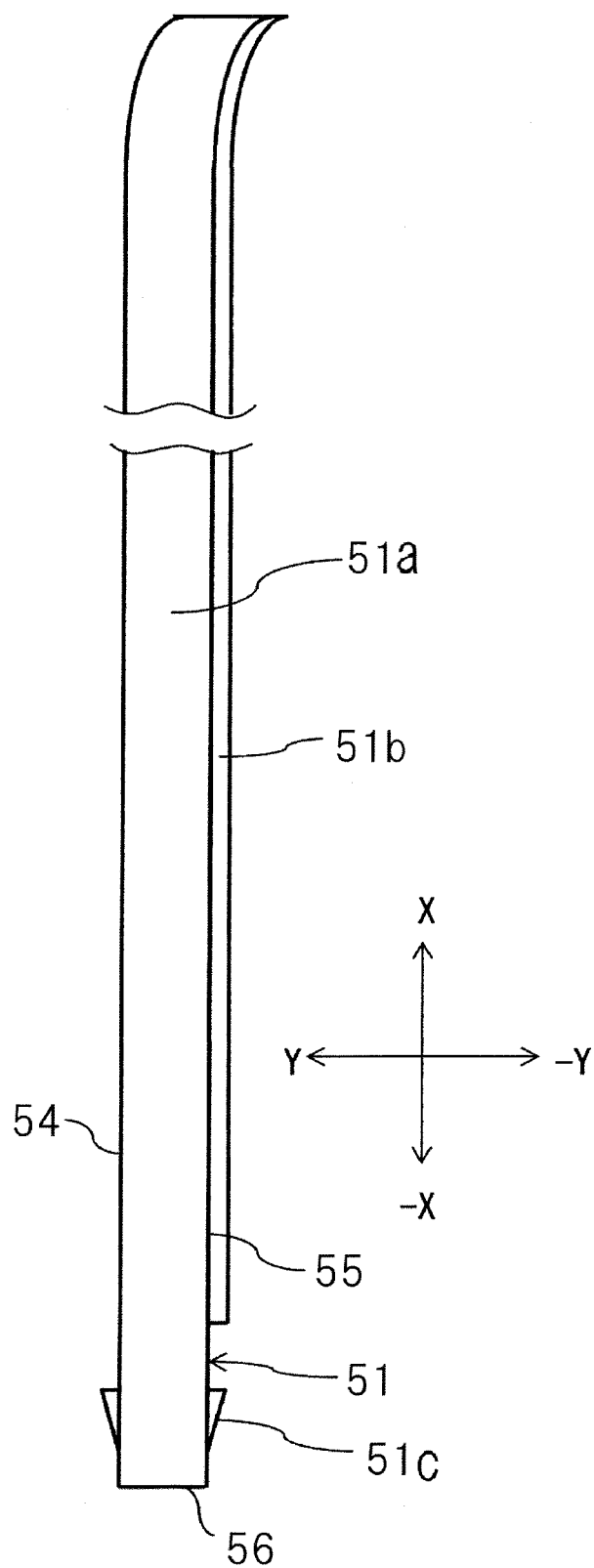
FIG. 7 is a schematic front view of the light guide member according to the embodiment of the present invention, as seen from the lower side thereof.

While the light guide member having a substantially rectangular parallelepiped shape, except the step portion, is shown in FIGS. 4 and 5, at least a part of the light guide member in the longitudinal direction may be curved. Although being simplified in FIGS. 4 and 5, a light source obtained by disposing a light-emitting diode in a case may be used, and a proximal end of the light guide member may be formed into a shape that fits the case of the light source. For example, FIG. 7 shows a schematic front view of the light guide member according to the embodiment of the present invention, as seen from the lower side thereof The light guide member 51 includes the main body 51a and the step portion 51b, and the reflection surface 55 and the light-emitting surface 54 are curved near a distal end of the light guide member 51. No step portion is provided near the proximal end to be mounted to the light source, and a wedge-shaped fitting portion 51c is formed.

While in the present embodiment, the light-emitting surface 61d of the illumination device for direct illumination is sandwiched between the first decoration member 21 and the second decoration member 22 of the decoration panel 2 of the door trim 1 shown in FIG. 1, arrangement of the light-emitting surface 61d is not limited thereto. The light-emitting surface 61d may be disposed, for example, above the first decoration member 21 or below the second decoration member 22. The material of the decoration members 21 and 22 is not particularly limited, and may be a resin (polymer substance) or wood. A resin plated with metal may also be used. In the above-described embodiment, the second decoration member 22 includes the metal molding 22b, and the metal molding 22b may be a metal sheet, or a resin plated with metal. In the above-described embodiment, the illumination device 3 (the light-emitting portion 61b of the illumination device) is sandwiched between the first decoration member 21 and the second decoration member 22 having the metal molding 22b. However, the structure of the decoration panel and arrangement of the illumination device are not limited thereto.

Figure 8A:
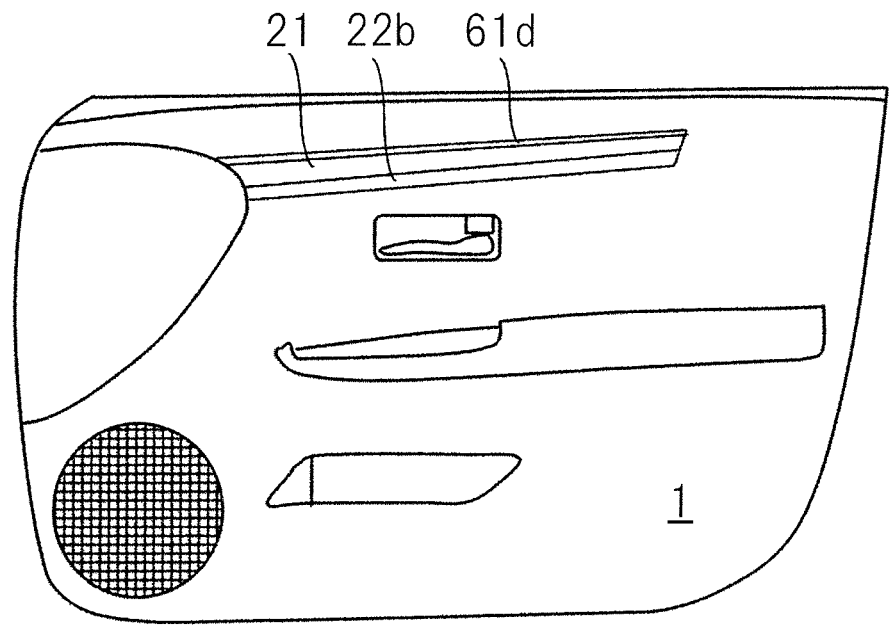
FIGS. 8A to 8F illustrate modifications of arrangement of an illumination device and a decoration member on a door trim.
Figure 8B:
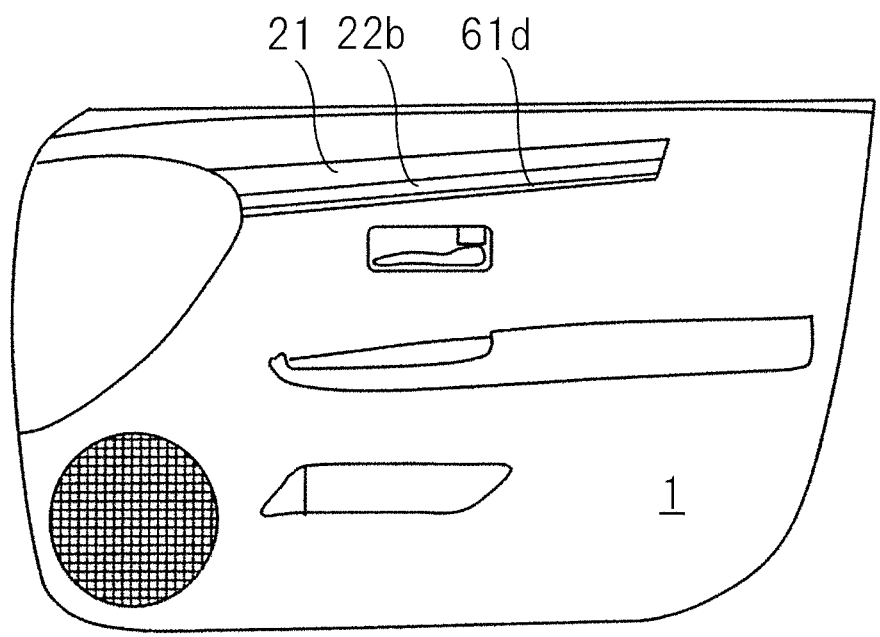
Figure 8C:
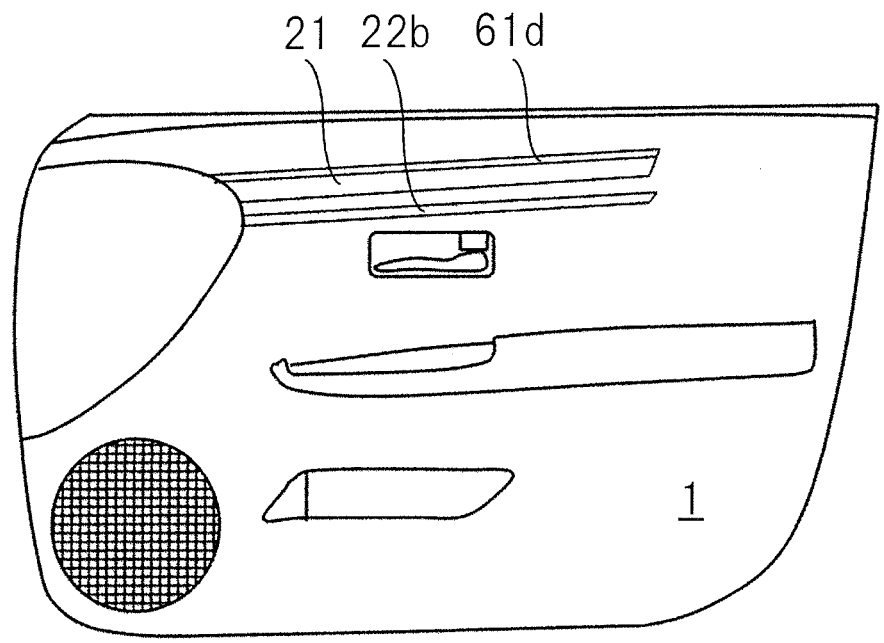
Figure 8D:
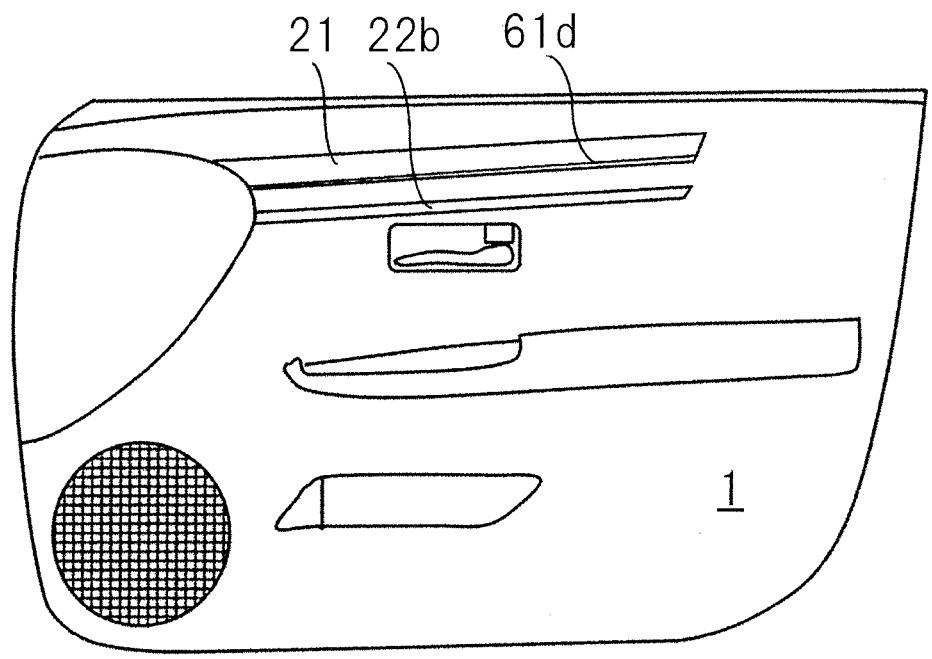
Figure 8E:
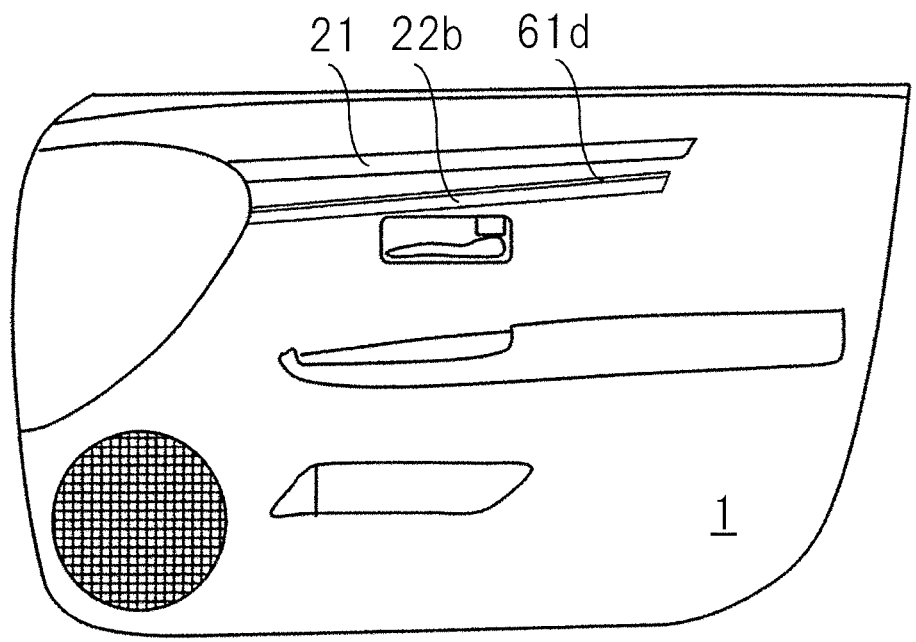
Figure 8F:
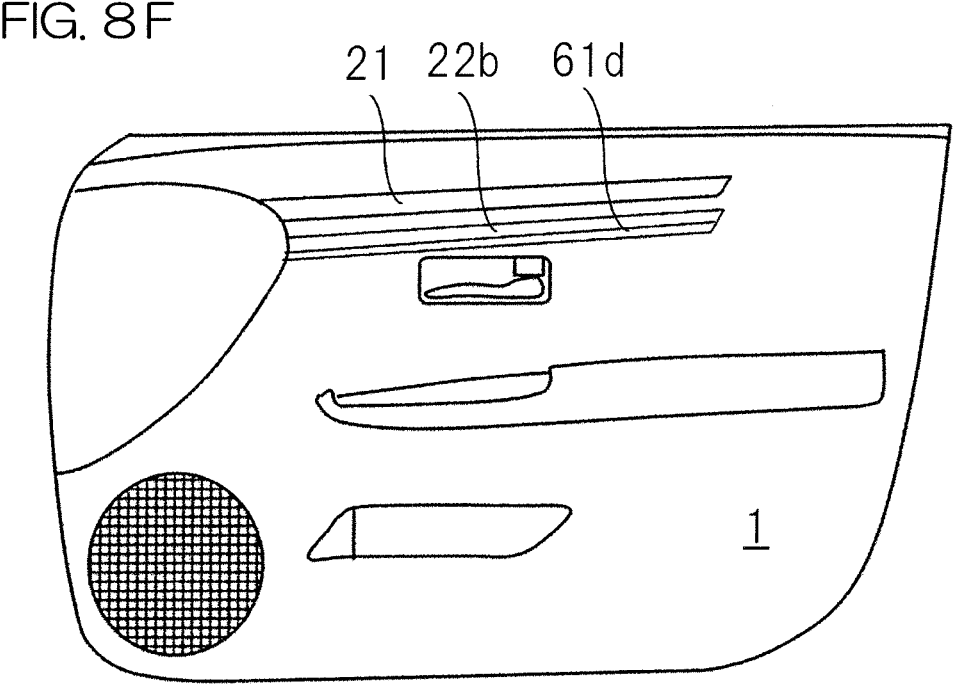

FIGS. 8A to 8F illustrate modifications of arrangement of the decoration members 21, 22 and the illumination device 3 on the door trim 1 of the front door. When the first decoration member 21 and the second decoration member 22 (metal molding 22b) are arranged on the decoration panel with substantially no gap therebetween, the light-emitting surface 61d of the diffusion member 6 of the illumination device 3 may be disposed directly above the first decoration member 21 as shown in FIG. 8A, or the light-emitting surface 61d may be disposed directly below the metal molding 22b as shown in FIG. 8B. Alternatively, the metal molding 22b may be disposed away from the first decoration member 21. Also in this case, the light-emitting surface 61d of the diffusion member 6 of the illumination device 3 may be arranged at arbitrary positions such as directly above the first decoration member 21 (FIG. 8C), directly below the first decoration member (FIG. 8D), directly above the metal molding 22b (FIG. 8E), and directly below the metal molding (FIG. 8F). The arrangement of the illumination device 3 of the present invention is not limited to the illustrated examples, and can be varied according to various designs of the door trim, for example, a door trim in which the second decoration member 22 having the metal molding 22b is disposed on the first decoration member, and a door trim having no metal molding 22b. In addition, the location where the illumination device is disposed is not limited to the decoration panel 2, and the illumination device may be disposed in another location in the door trim 1.

Figure 9:
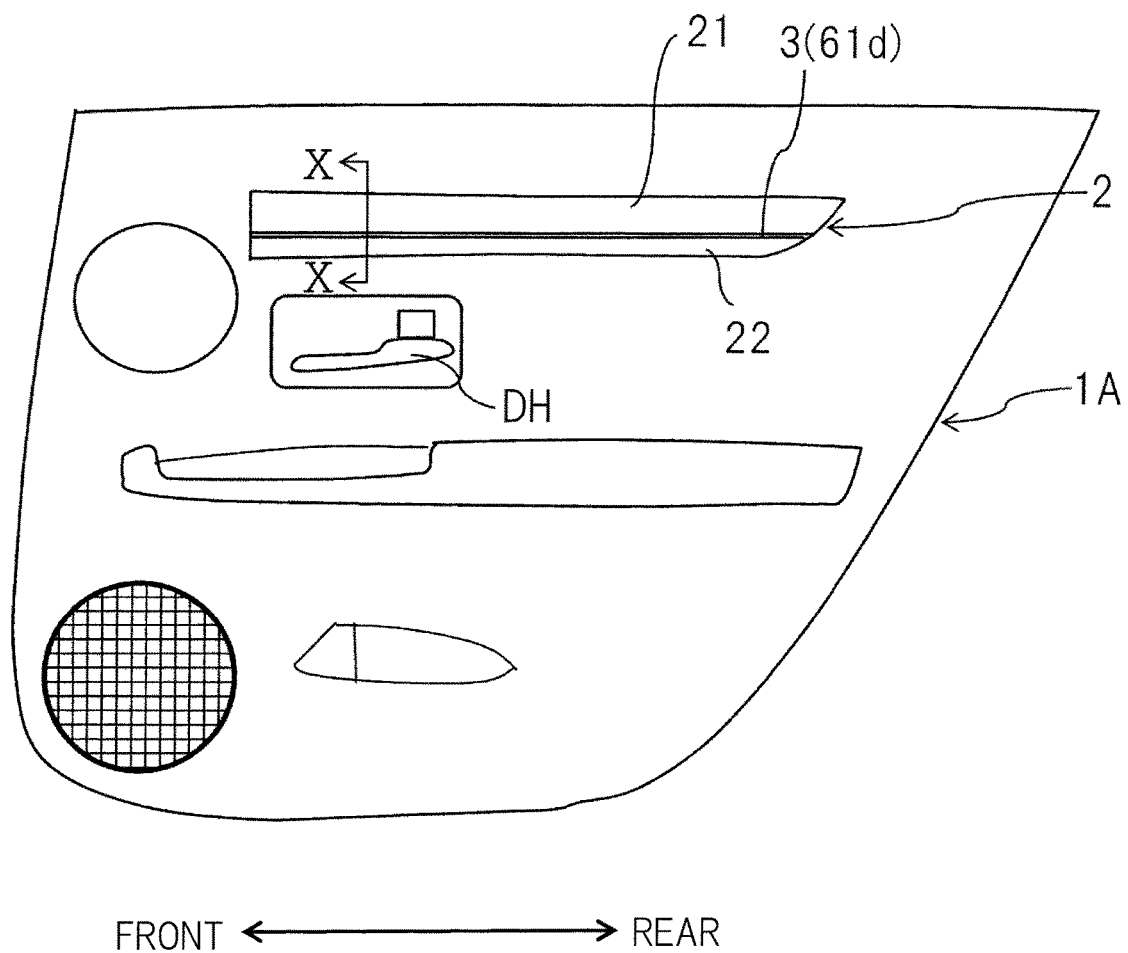
FIG. 9 is a schematic front view of a door trim of a rear door on which the illumination device according an embodiment of the present invention is mounted, as seen from inside the vehicle cabin.

While in the embodiment shown in FIG. 1, the illumination device 3 is provided on the door trim 1 of the front door, the illumination device 3 may be provided on a door trim 1A of a rear door as shown in FIG. 9. For example, FIG. 10 is a cross-sectional view illustrating a part of the door trim 1A shown in FIG. 9 at a cross-section taken along a X-X line in FIG. 9. In FIG. 10, the light-emitting surface 61d of the diffusion member 6 of the illumination device 3 is disposed between the first decoration member 21 and the second decoration member 22. In the cross section shown in FIG. 10, the resin base 22a of the second decoration member 22 does not show the vertical wall portion 22aa as shown in FIG. 2. However, for example, as in the structure shown in FIG. 2, an engagement piece may be formed in the diffusion member 6 and a vertical wall portion may be formed in the resin base 22a at a predetermined position along the longitudinal direction to which the illumination device 3 extends, and a fastening portion of the first decoration member 21 may be inserted therethrough and fixed to a base body 1Aa, and thus the diffusion member 6 and the second decoration member 22 may be mounted to the base body 1Aa of the door trim. In FIG. 10, as in FIG. 1, the light-emitting surface 61d of the diffusion member 6 of the illumination device 3 is sandwiched between the first decoration member and the second decoration member in the up-down direction. However, various modifications can be adopted in accordance with the design of the door trim, like those described with reference to FIGS. 8A to 8F. While each of the door trims shown in FIG. 1, FIGS. 8A to 8F, and FIG. 9 is a right-side door, a similar illumination device may be provided on a left-side door. The illumination device may include a component other than the light source, the light guide member, and the diffusion member. For example, a constitution including the decoration panel may be regarded as an illumination device.

While in the present embodiment a door trim is used as an object to which the automobile illumination device of the present invention is mounted, the object is not limited to a door trim but may be an instrument panel, a ceiling, a center console, etc.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 Door trim
2 Decoration panel
21 First decoration member
22 Second decoration member
3 Illumination device
51 Light guide member
52 Light source
53 Optical patterns
54 Light-emitting surface 55 Reflection surface
6 Diffusion member
61 Lens unit
61a Light-receiving portion
61b Light-emitting portion
61c Light-receiving surface
61d Light-emitting surface
62 Accommodation unit
62c Engagement portion
62d Engagement piece
62e Hole

What is claimed is:

1. An illumination device of a vehicle, comprising:
   a light source;
   a bar-shaped light guide member; and
   a diffusion member including a lens unit, the lens unit having an L-shaped cross-section, and a light-emitting portion and a light-receiving portion,
   wherein
   the light guide member has a flat light-emitting surface and a reflection surface on an opposite side of the light-emitting surface,
   the light guide member and the lens unit are disposed such that a light-receiving surface of the light-receiving portion of the lens unit is opposed to the light-emitting surface of the light guide member, and
   the light-emitting portion of the lens unit extends from a base portion of the light-receiving portion in a direction opposite to the light guide member and has a light-emitting surface in an end surface thereof.

2. The illumination device of a vehicle as claimed in claim 1, wherein the diffusion member includes a diffusion material that diffuses light.

3. The illumination device of a vehicle as claimed in claim 1, wherein the diffusion member has an engagement portion configured to hold the light guide member.

4. The illumination device of a vehicle as claimed in claim 3, wherein the light guide member has a step portion configured to be engaged with the engagement portion.

5. The illumination device of a vehicle as claimed in claim 1, wherein the light-emitting portion of the lens unit has a length of not less than 5 mm.

6. The illumination device of a vehicle as claimed in claim 1, wherein the light-receiving surface of the light-receiving portion of the lens unit is in
   close contact with the light-emitting surface of the light guide member with no gap therebetween.

7. The illumination device of a vehicle as claimed in claim 1, further comprising a decoration panel of a door trim of the vehicle, wherein the decoration panel includes a first decoration member and a second decoration member, and the light-emitting surface of the lens unit is disposed between the first and the second decoration members.

8. The illumination device of a vehicle as claimed in claim 1, wherein the light guide member has a substantially polygonal cross-section, where the light-emitting surface and a reflection surface opposite to the light-emitting surface are parallel to each other.

9. The illumination device of a vehicle as claimed in claim 8, wherein the refection surface has grooves arranged at intervals to enhance optical performance of the reflection surface.

* * * * *